US008136791B2

(12) United States Patent
Denis et al.

(10) Patent No.: US 8,136,791 B2
(45) Date of Patent: Mar. 20, 2012

(54) FLUID FILLING AND/OR EXTRACTION CONTROL DEVICE AND TANK INCLUDING ONE SUCH DEVICE

(75) Inventors: Arnaud Denis, Lainville en Vexin (FR); Renaud Ligonesche, Herblay (FR); Philippe Pisot, L'Isle Adam (FR)

(73) Assignee: L'Air Liquide Societe Anonyme pour l'Etude Et l'Exploitation des Procedes Georges Claude, Paris (FR)

( * ) Notice: Subject to any disclaimer, the term of this patent is extended or adjusted under 35 U.S.C. 154(b) by 907 days.

(21) Appl. No.: 12/091,669

(22) PCT Filed: Oct. 18, 2006

(86) PCT No.: PCT/FR2006/051047
§ 371 (c)(1),
(2), (4) Date: Jul. 25, 2008

(87) PCT Pub. No.: WO2007/048952
PCT Pub. Date: May 3, 2007

(65) Prior Publication Data
US 2008/0308181 A1 Dec. 18, 2008

(30) Foreign Application Priority Data

Oct. 27, 2005 (FR) ...................................... 05 53265

(51) Int. Cl.
*F16K 51/00* (2006.01)
(52) U.S. Cl. .................. 251/144; 137/320; 222/153.14; 141/347
(58) Field of Classification Search .................. 251/144, 251/145, 149, 149.9; 137/206, 317, 320, 137/798; 141/3, 346, 347; 222/153.01, 153.11, 222/153.13, 153.14
See application file for complete search history.

(56) References Cited

U.S. PATENT DOCUMENTS
2,756,105 A 7/1956 Magill
(Continued)

FOREIGN PATENT DOCUMENTS
DE 43 34 182 4/1995
(Continued)

OTHER PUBLICATIONS
International Search Report for PCT/FR2006/051047.
(Continued)

*Primary Examiner* — John Fristoe, Jr.
*Assistant Examiner* — Ian Paquette
(74) *Attorney, Agent, or Firm* — Allen E. White

(57) ABSTRACT

The invention relates to a device for controlling the filling and/or extraction of a fluid, for example, in relation to a pressurized fluid tank including a body having a connection end (516) which is equipped with engagement means that are intended to co-operate with complementary engagement means which are provided, for example, on a connection interface of a tank, a member (17) for opening a valve that can move in relation to the body, actuation means (250) which can move the opening member (17) selectively and which can move between a running position and a stopped position corresponding respectively to an operating position and a rest position of the opening member (17) and a hole (105) which can receive a removable outlet or inlet coupling (75) for the distribution of the fluid. The invention is characterized in that the device includes retractable locking means (55) which are used to lock the actuation means (250) in the running position and which are designed to co-operate with the hole (105), such that, when there is no coupling (75) connected to the control device in the corresponding hole, the locking means (55) are biased towards the retracted position, thereby preventing the actuation means (250) from being stably maintained in the running position.

9 Claims, 12 Drawing Sheets

U.S. PATENT DOCUMENTS

| | | | |
|---|---|---|---|
| 3,035,605 A | 5/1962 | Ninnelt | |
| 3,788,511 A | 1/1974 | Marsh | |
| 3,921,872 A | 11/1975 | Buell, Jr. | |
| 4,832,398 A | 5/1989 | Tecca et al. | |
| 4,905,855 A | 3/1990 | Troiano et al. | |
| 4,964,529 A | 10/1990 | Houston | |
| 5,018,552 A * | 5/1991 | Politi et al. | 137/614.11 |
| 5,067,520 A * | 11/1991 | Kremer et al. | 137/614.2 |
| 5,127,436 A | 7/1992 | Campion et al. | |
| 5,452,738 A | 9/1995 | Borland et al. | |
| 5,465,754 A | 11/1995 | Sudo et al. | |
| 5,562,117 A | 10/1996 | Borland | |
| 5,829,629 A | 11/1998 | Usher | |
| 5,975,121 A | 11/1999 | Arzenton et al. | |
| 5,996,625 A * | 12/1999 | Collado et al. | 137/614.19 |
| 6,003,547 A * | 12/1999 | Tippmann, Jr. | 137/588 |
| 6,167,908 B1 * | 1/2001 | Rottger | 137/614.17 |
| 6,539,970 B1 * | 4/2003 | Knowles et al. | 137/238 |
| 6,557,821 B2 | 5/2003 | Girouard et al. | |
| 6,620,256 B1 | 9/2003 | Arno | |
| 6,691,729 B2 | 2/2004 | Takeda et al. | |
| 6,786,131 B2 | 9/2004 | Tsai | |
| 6,929,028 B2 | 8/2005 | Larsen et al. | |
| 2002/0036278 A1 | 3/2002 | Girouard et al. | |
| 2004/0144803 A1 | 7/2004 | Baker | |
| 2005/0051750 A1 * | 3/2005 | Morin | 251/149.9 |
| 2006/0065672 A1 | 3/2006 | Lecourt et al. | |
| 2009/0166359 A1 | 7/2009 | Pisot | |
| 2009/0223580 A1 | 9/2009 | Denis et al. | |
| 2009/0223976 A1 | 9/2009 | Denis et al. | |
| 2010/0059142 A1 | 3/2010 | Denis | |

FOREIGN PATENT DOCUMENTS

| | | |
|---|---|---|
| EP | 0 467 769 | 1/1992 |
| EP | 0 668 468 | 1/1995 |
| EP | 1 143 191 | 4/2000 |
| EP | 1026438 | 8/2000 |
| EP | 1 316 755 | 6/2003 |
| EP | 1 367 316 | 12/2003 |
| EP | 1 943 456 | 7/2008 |
| FR | 2 716 951 | 9/1995 |
| FR | 2774452 | 8/1999 |
| FR | 2793297 | 11/2000 |
| FR | 2803366 | 7/2001 |
| FR | 2 892 797 | 5/2007 |
| FR | 2 892 798 | 5/2007 |
| WO | WO 2007 048952 | 5/2007 |
| WO | WO 2007 048953 | 5/2007 |
| WO | WO 2007 048954 | 5/2007 |
| WO | WO 2007 048955 | 5/2007 |
| WO | WO 2007 048956 | 5/2007 |
| WO | WO 2007 048957 | 5/2007 |

OTHER PUBLICATIONS

French Search Report for related FR 0552598, Oct. 7, 1998.
French Search Report for related FR 0571098, Feb. 4, 2000.
French Search Report for related FR 0581212, Oct. 18, 2000.
US Office Action for related U.S. Appl. No. 12/091,657, Jun. 8, 2011.
Response to Office Action for related U.S. Appl. No. 12/091,657, Sep. 8, 2011.
Supplemental Response to Office Action for related U.S. Appl. No. 12/091,657, Sep. 12, 2011.
Pending claim set for related U.S. Appl. No. 12/091,657, Sep. 12, 2011.
French Search Report and Written Opinion for related FR 0553261, Jul. 20, 2006.
International Search Report and Written Opinion for related PCT/FR2006/051049, Feb. 13, 2007.
French Search Report for related FR 0553263, Jun. 29, 2006.
International Search Report and Written Opinion for related PCT/FR2006/051048, Feb. 5, 2007.
French Search Report for related FR 0553265, Jun. 29, 2006.
Written Opinion for related PCT/FR2006/051047, Feb. 5, 2007.
US Office Action for related U.S. Appl. No. 12/091,678, Aug. 3, 2010.
Response to Office Action for related U.S. Appl. No. 12/091,678, Feb. 2, 2011.
US Office Action for related U.S. Appl. No. 12/091,678, Apr. 14, 2011.
Response to Office Action for related U.S. Appl. No. 12/091,678, Jul. 14, 2011.
Pending claim set for related U.S. Appl. No. 12/091,678, Jul. 14, 2011.
Notice of Allowance for related U.S. Appl. No. 12/091,678, Aug. 5, 2011.
International Search Report and Written Opinion for related PCT/FR2006/051053, Feb. 20, 2007.
US Office Action for related U.S. Appl. No. 12/091,683, Jun. 21, 2011.
Response to Office Action for related U.S. Appl. No. 12/091,683, Sep. 21, 2011.
Pending claim set for related U.S. Appl. No. 12/091,683, Sep. 21, 2011.
International Search Report and Written Opinion for corresponding PCT/FR2006/051050, Feb. 13, 2007.
US Office Action for related U.S. Appl. No. 12/091,690, Jun. 23, 2011.
Response to Office Action for related U.S. Appl. No. 12/091,690, Sep. 22, 2011.
Pending claim set for related U.S. Appl. No. 12/091,690, Sep. 22, 2011.
International Search Report and Written Opinion for related PCT/FR2006/051051, Feb. 13, 2007.

* cited by examiner

FLUID FILLING AND/OR EXTRACTION CONTROL DEVICE AND TANK INCLUDING ONE SUCH DEVICE

The present invention relates to a device for controlling the filling with and/or extraction of fluid and to an assembly made up of a tank and of such a device.

The invention relates more specifically to a device for controlling the filling and/or the extraction of fluid particularly from a tank of pressurized fluid comprising a body having a connection end provided with attachment means intended to collaborate with complementary attachment means, particularly of a tank connection interface, a member for opening a valve that can move relative to the body, actuating means capable selectively of moving the opening member, the actuating means being able to move between an on position and an off position which correspond respectively to a work position and a rest position of the opening member, an orifice intended to accommodate an inlet or outlet coupling for distributing fluid from or to the tank.

One requirement is the widescale provision to non-specialists of systems that require the use of gas (professionals such as nurses, laboratory workers, for example, or the general public such as DIY enthusiasts, motorists, etc.).

One objective of the systems for storing fluid, and of the devices for filling them and/or extracting fluid from them, is to make the handling operations needed to exchange an empty tank for a full tank easier. The storage systems have in addition implicitly to provide a level of safety that allows the handling operations to be performed by non-specialists while at the same time improving the safety and productivity in tank filling centers.

One problem to be resolved by these systems is that of simplifying and safeguarding a device associated with an outlet coupling of a system delivering gas (without using a tool, for example).

There is therefore a need to make the handling operations associated with opening and closing off a system that delivers gas obvious while at the same time making sure that delivery can occur only when all the safety conditions are satisfied. Specifically, the systems have to be capable of preventing gas from being distributed into the user's direct surroundings.

Furthermore, another problem presented by the current systems lies in the fact that the outlet couplings do get contaminated (for example with dirt or by insects nesting therein).

It is one object of the present invention to alleviate all or some of the disadvantages recalled hereinabove of the prior art.

To this end, the device for controlling the filling and/or extraction of fluid from, in particular, a pressurized-fluid tank according to the invention, in other respects in accordance with the generic definition given thereof in the above preamble, is essentially characterized in that it comprises retractable means of locking the actuating means in the on position, the retractable locking means being configured in such a way as to collaborate with the orifice in such a way that when a coupling is not connected to the control device in the orifice, the locking means are urged into their retracted position preventing the actuating means from remaining stably in the on position.

Furthermore, the invention may have one or more of the following features:

the retractable locking means are configured in such a way that when a coupling is connected to the control device in the orifice, a connection tell-tale transmits a force to the locking means so as to maintain the latter in an active position that locks the actuating means in the on position.

The device comprises intermediate means that transmit the maintaining force to the locking means; the intermediate transmission means comprising a moving member that has a first end capable of collaborating in abutment with a coupling in the orifice and a second end capable of collaborating in abutment with the retractable locking means.

When a coupling is disconnected and extracted from the orifice, the maintaining force on the locking means is automatically removed, the locking means being retracted in order to switch the actuating means into the off position.

The actuating means comprise a translationally mobile switch.

The device comprises return means urging the locking means toward the retracted position.

The device comprises a shut-off element capable of being moved between positions in which it opens and closes the orifice for the coupling, and in that the shut-off element constitutes the moving member of the intermediate means for transmitting$^2$ the maintaining force to the locking means.

The shut-off element comprises an attachment portion, when the shut-off element is in the opening position, the attachment portion projecting into the orifice so as to allow it to collaborate for the purposes of attachment with a mating portion belonging to a coupling.

The device comprises closure means intended to make the member move into its rest position.

The locking means comprise an elastic attachment portion, the elastic attachment portion and the actuating means having mating shapes so that when the locking means are in the active locking position the movement of the actuating means toward the on position causes the elastic portion to become attached to the actuating means.

The closure means are able to move between an inactive position and an active position, in the active position, the closure means collaborating with the actuating means in order to move and/or to deform the elastic attachment portion and thus release the locking of the actuating means.

Another object of the invention is to provide an assembly made up of a pressurized-fluid tank and a control device, the tank comprising a casing delimiting a storage volume and provided with an orifice allowing communication with the inside of the tank, a filling and distribution head positioned at the orifice, an isolating member such as an isolating valve, a connection interface intended to collaborate removably with a control device, the control device being the control device in accordance with any one of the features mentioned hereinabove or hereinafter.

Other particulars and advantages will become apparent from reading the following description which is given with reference to the figures in which:

FIG. 1 depicts an external view in isometric projection of one exemplary embodiment of a tank according to the invention, FIG. 2 is a view in longitudinal section on a larger scale of the upper part of the tank of FIG. 1, FIGS. 3 and 4 are external views in isometric projection of one exemplary embodiment of a head for delivering fluid according to the invention with, in FIG. 4, an outlet coupling connected, FIG. 5 is a view in longitudinal section of the delivery head of FIG. 4 equipped with its outlet coupling;

Figure 1:
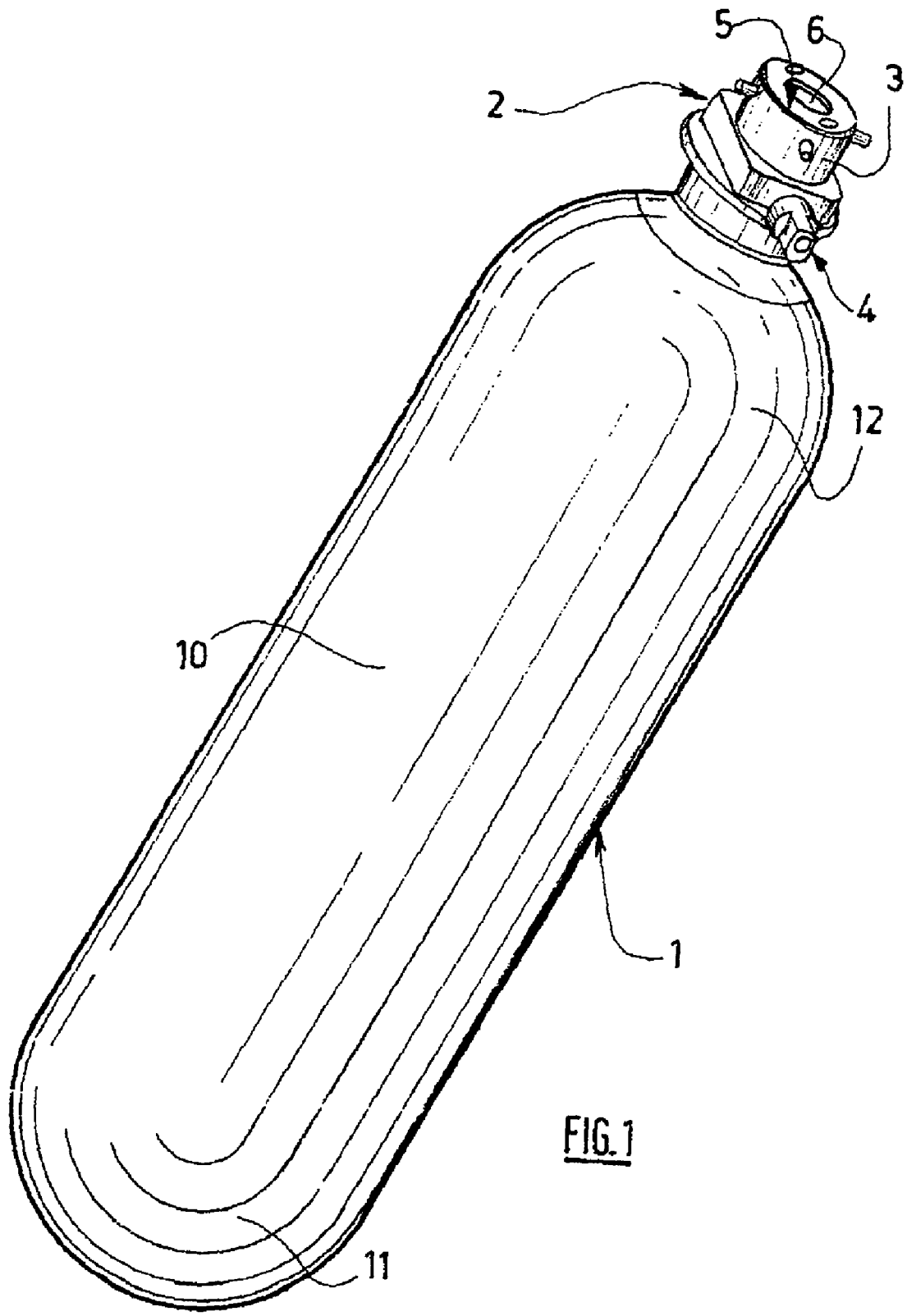

FIG. 1 depicts an oblong tank body 1 having a cylindrical main part 10 and two substantially dome-shaped ends, one lower 11 and one upper 12. The rounded upper end 12 has a filling and distribution head 2. As depicted, the filling and distribution head 2 in particular comprises a connection interface 3, a tell-tale indicating the fill level 4, an anti-knock shield 5 and a central orifice 6 providing access to the inside of the tank 1.

Figure 2:
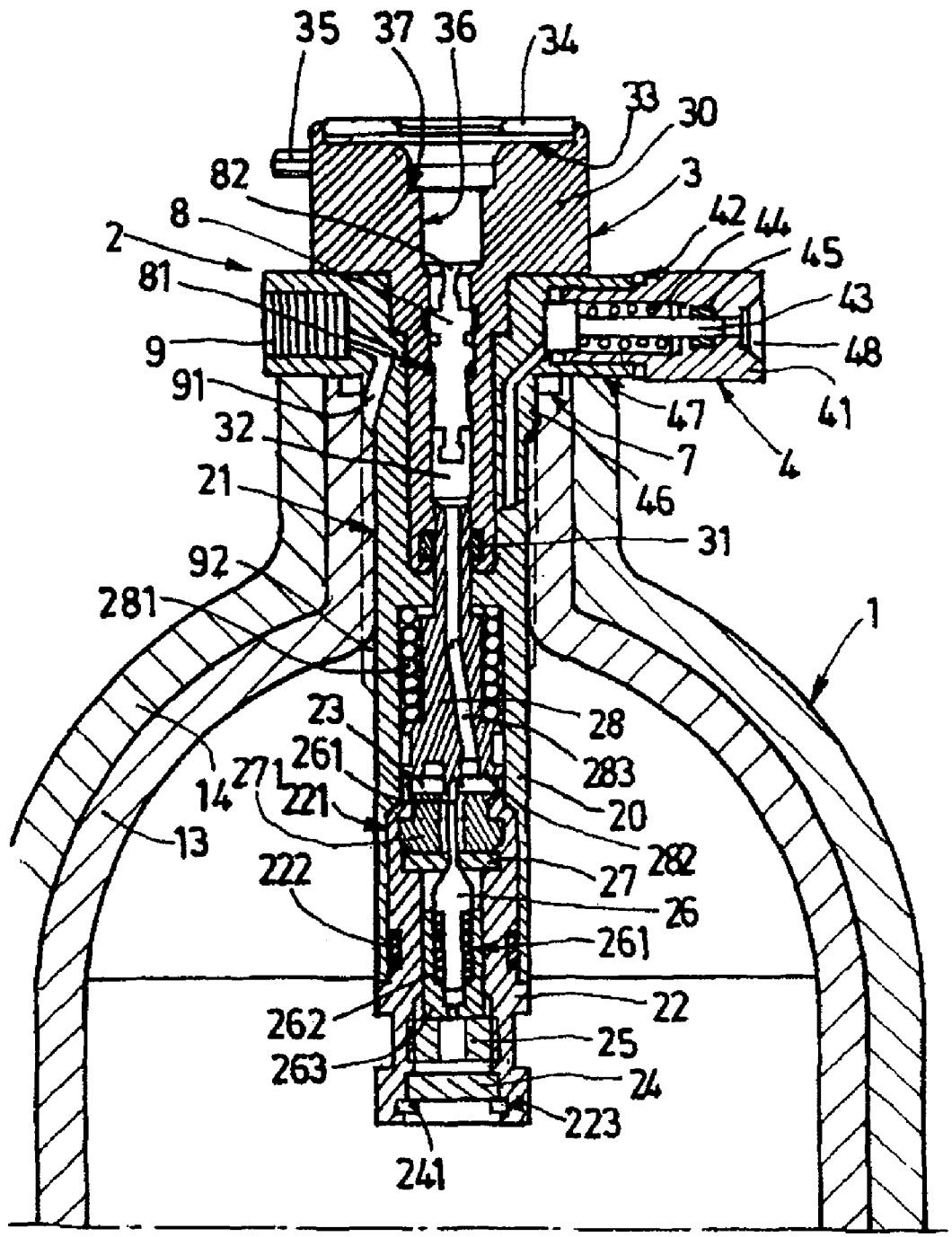

With reference to FIG. 2, the tank 1 comprises a sealed internal casing 13 (or "liner") for example made of aluminum alloy or the like, intended to contain the fluid and particularly the gas under pressure. The casing 13 is reinforced on its external surface by a winding of carbon fiber filaments 14 bonded together with epoxy resin or any other equivalent means.

An oblong filling and distribution head 2 is positioned inside the tank 1, at the orifice of the tank 1, inside the casing 13.

The body 20 of the filling and distribution head 2 is mechanically connected to the casing 13 by virtue of a screw thread 21 collaborating with a tapped thread formed on the casing 13. An annular seal 7 is positioned in a groove formed in the casing 13. The groove lies at the upper end of the casing 13 and is enclosed by the body 20 of the filling and distribution head, so as to provide sealing between the body 20 and the inside of the tank 1.

The filling and distribution head 2 in its lower part comprises a pre-regulating cartridge 22 which is screwed into its body 20 by virtue of a screw thread/tapped thread system 221.

Downstream of the pre-regulating cartridge 22 (toward the top of the cartridge 22), the filling and distribution head 2 comprises a low-pressure chamber 23. Sealing between the inside of the tank 1 and the low-pressure chamber 23 is afforded by the combination 222 of an O-ring and anti-extrusion rings positioned between the cartridge 22 and the body 20 of the head 2.

The pre-regulating cartridge 22 comprises, working from upstream to downstream (that is to say from its lower part toward its upper part in FIG. 2), a filter 24 and a pre-regulating valve 26. The filter 24 is held in the cartridge 22 by an elastic ring 241 housed in a groove 223 formed in the body of the cartridge 22.

The pre-regulating valve 26 is subjected to the action of a spring 261 moving it toward a seat 27 held in the cartridge 22 under the action of a threaded seat holder 271. The valve 26 is subjected to the force of the valve spring 261 and to the force of the pressurized gas.

The upper end of the valve 26 is equipped with a stem 261 extending upward and the end of which is in contact with a pre-regulating piston 28. The piston 28 for its part is urged toward the valve 26 by a spring 281. Because of the force of the spring 281 and the action of the gas on the cross section 282 of the piston 28, the valve 26 acts as a pressure regulator.

During phases in which gas is extracted from the tank 1, the gas contained in the tank 1 under high pressure passes, while its pressure is being reduced, through the pre-regulating cartridge 22 toward the low-pressure chamber 23.

The pressure-regulated gas then passes through the piston 28 via a drilling 283 formed in the body of the piston, to emerge in a chamber 32 situated in the body 30 of a connection interface 3. The connection interface is mounted at the upper end of the head 2.

The chamber 32 comprises an isolating valve 8 which is sealed with respect to the inside of the tank by a seal 81 that seals against the body 30 of the connection interface 3.

The default setting of the isolating valve 8 is closed. The isolating valve 8 is, for example, a valve of a conventional type, such as a valve comprising a fixed tubular body and a rod capable of moving inside the body to make the valve allow the passage of fluid or prevent the passage of fluid depending on the position of the rod.

The valve 8 can be actuated by a valve driver described in greater detail hereinafter and belonging to a system that receives the storage assembly or to a gas distribution head or to a filling connector.

The upper end of the connection interface 3 projects out from the filling and distribution head 2 and from the tank 1.

This outer part of the connection interface 3 comprises four projecting pins 35 (bayonets) positioned 90° apart to allow for attachment of a receiving system belonging to a storage assembly or to a gas distribution head or to a filling connector. Of course, this exemplary embodiment is non-limiting, particularly given the considerable number of conceivable combinations of numbers and positions of pins and corresponding polarizing (that is to say geometrical identity) options available. In addition, other attachment means that perform the same function are conceivable, including screw/nut connections, a latch lock lever, a retractable catch, etc.

The outer part of the connection interface 3 comprises a tubular housing forming an accommodating region 36 the purpose of which is to accept and to guide a mating tubular end of a receiving system or of a gas distribution head or of a filling connector as described hereinafter.

To this end, the mating tubular end of the control member intended to be connected to the tank 1 preferably comprises an O-ring seal and possibly an anti-extrusion ring to ensure the continuity of the seal between the control device and the tank 1.

The external part of the connection interface 3 preferably comprises a removable protective membrane 33 intended to avoid the ingress of particles or dirt into the accommodating region 36 and that might cause the system to malfunction. The membrane 36 is, for example, made of precut shape-memory polymer. The membrane is, for example, held at the inlet of the accommodating region 36 by a plastic anti-impact shield 34. Of course, any other form of embodiment for protecting the inlet of the accommodating region is conceivable, for example a film that has to be punctured or a sticker that has to be removed.

Thus, when the tubular end of a control device (receiving system or gas distribution head or filling connector) is introduced into the accommodating region 36, the precut membrane 33 will move aside against the surface 37 of the connection interface 3. For example, the shape-memory protective membrane 33 is precut into four "petal-shaped" lobes. The male tubular end of a control device will push the four lobes back against the surface 37 of the connection interface 3. The lobes will automatically return to their initial position (FIG. 3) when this same tubular end is extracted.

The tank 1 comprises a tell-tale 4 comprising a body 41 screwed into the body 20 of the device of the filling and distribution head 2 by means of a screw thread system 47. Sealing between the tell-tale and the filling head 2 is provided by means of a stressed metal seal 42. A moving spindle 43 is guided in the body 41 of the tell-tale 4. Sealing between the spindle 43 and the body 41 is afforded by the combination 45 of an O-ring and of an anti-extrusion ring.

The spindle 43 of the tell-tale 4 is subjected to the opposing forces of a return spring 44 and of the pressure of the gas contained in the tank 1 carried through the tell-tale 4 via a screw thread 21 and drillings 46.

When the action of the gas pressure exceeds the force of the return spring 44, the end of the spindle 43 emerges into a viewing chamber 48 formed in the body 41 of the tell-tale 4. Thus, the tell-tale indicates that the gas store is full (the pressure of the gas contained in the tank 1 is optimal). If not, the end of the spindle 43 does not emerge into a viewing chamber 48, and this indicates that the gas store is not full (the pressure of the gas contained in the tank 1 is below the optimum pressure).

A safety device (of the type that melts under the action of heat and/or discharge valve, rupture disk, etc. type) may be fitted to the tank 1 via a port 9 formed in the body 20 of the filling and distribution head 2. This safety device may be fed with the gas contained in the tank 1 via a cut 92 machined in the screw thread 21 and via drillings 91.

Figure 3:
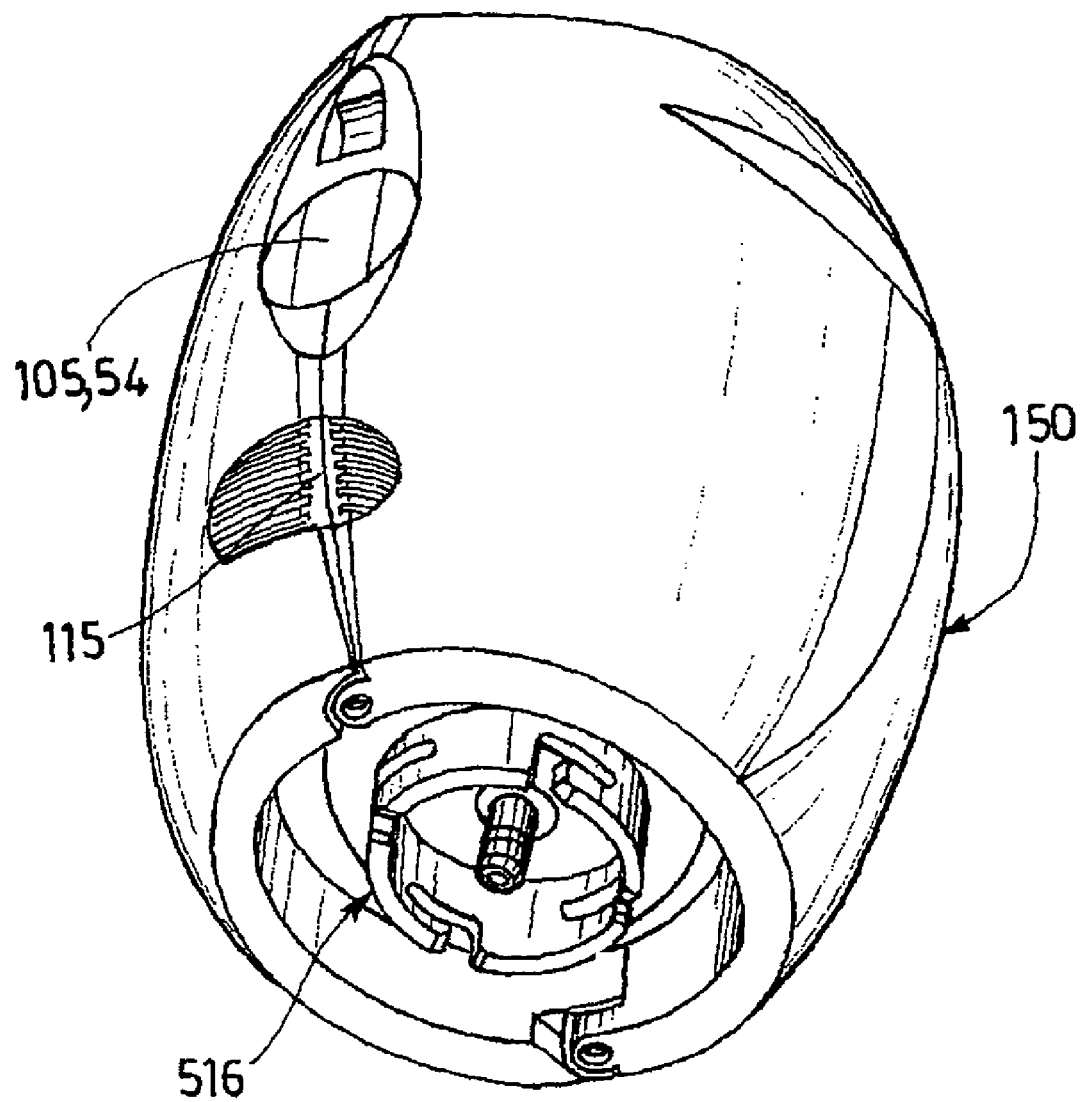
Figure 4:
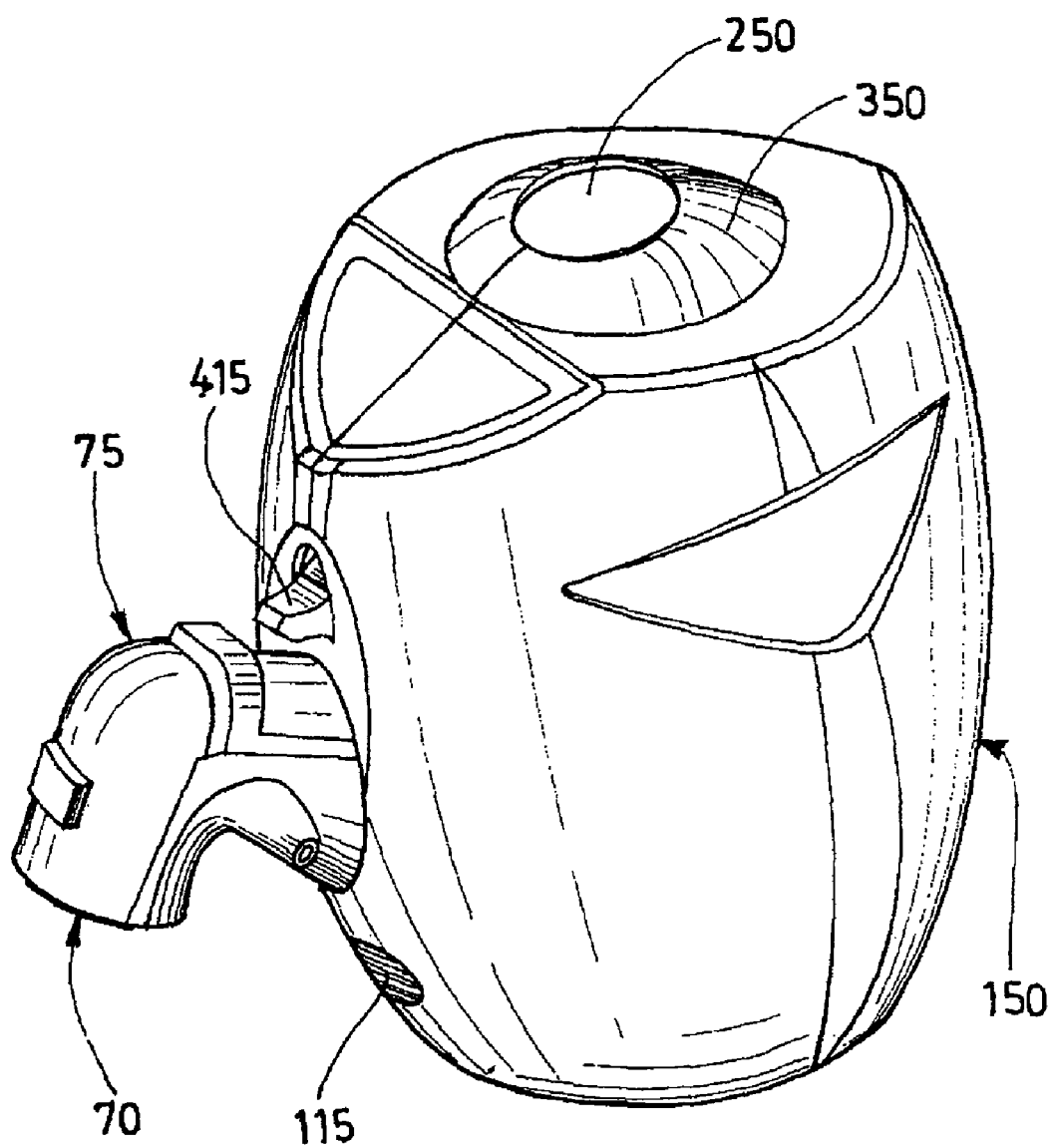

FIGS. 3 and 4 illustrate a removable gas delivery head 150 comprising a control to open up the flow rate of gas 250, an annular knob to shut off the flow rate of gas 350, access 105 to the outlet coupling naturally closed off by a shutter 54 to prevent contamination and a connection interface 516. The gas delivery head 150 also comprises medium-pressure and low-pressure discharge valve discharge louvers 115.

FIG. 4 illustrates the gas delivery head 150 equipped with an outlet coupling 75 the orifice 70 of which is connected to a fluid supply hose (not depicted). The coupling is intended to be connected removably to an orifice 105 of the delivery head 150.

Figure 5:
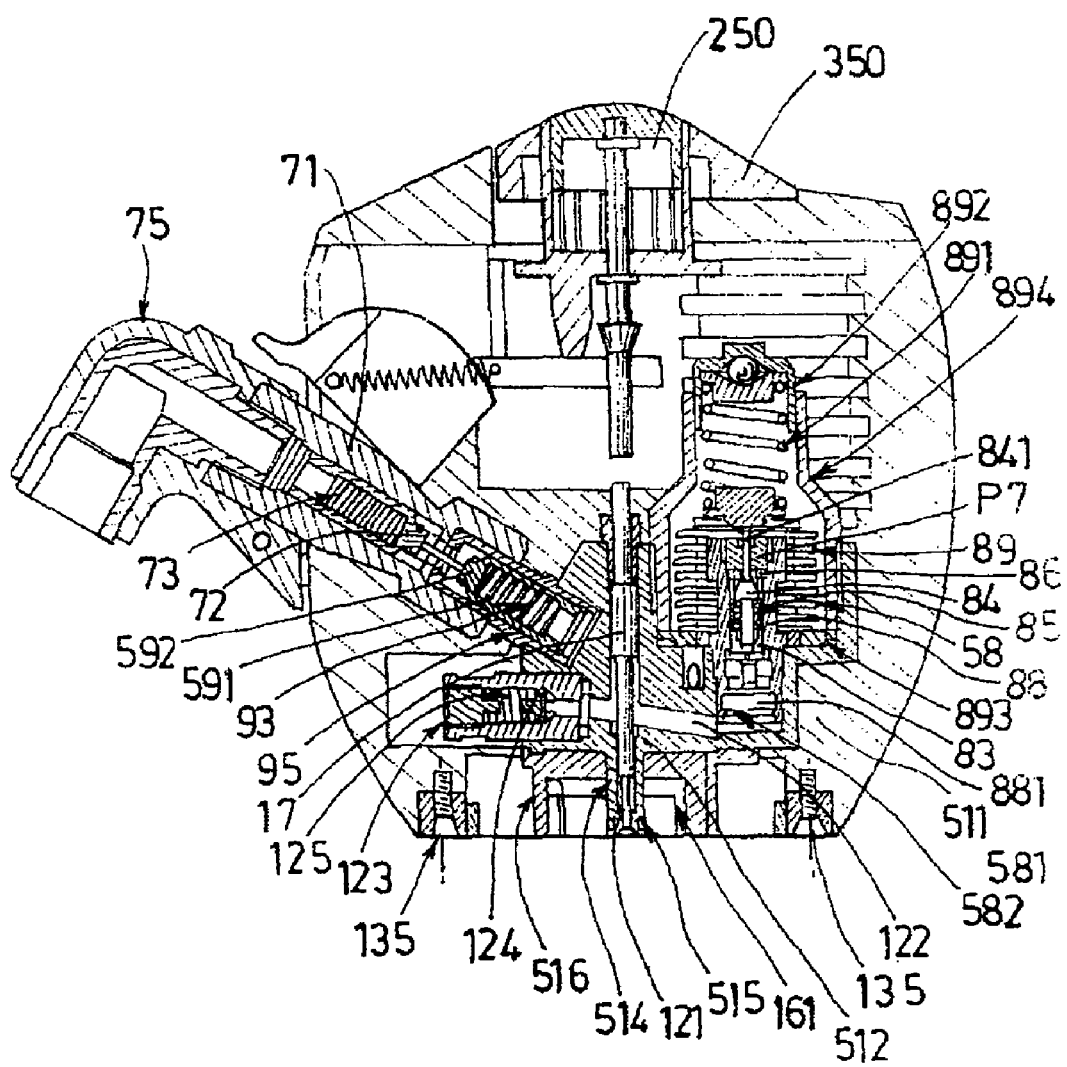

FIG. 5 depicts details of the gas delivery head according to the same embodiment. The case that protects the delivery head 150 is made up of two half-shells 511 joined together by clips and two screws 135. The delivery head 150 contains, on the one hand, a body 512 comprising the various active gas-delivery components and, on the other hand, the user interface controls. In particular, the delivery head 150 comprises a control to open up the flow rate of gas 250, an annular knob to close off the flow rate of gas 350, and an access 105 providing access to the outlet coupling 75.

The lower part of the body 512 ends in a tubular end 514 with an O-ring seal 515 and a component 516 displaying symmetry of revolution and which in this instance has four millings 161 positioned 90° apart. Of course, the invention is not restricted to this configuration and any other combination of number and positions of millings may be considered.

Figure 12:
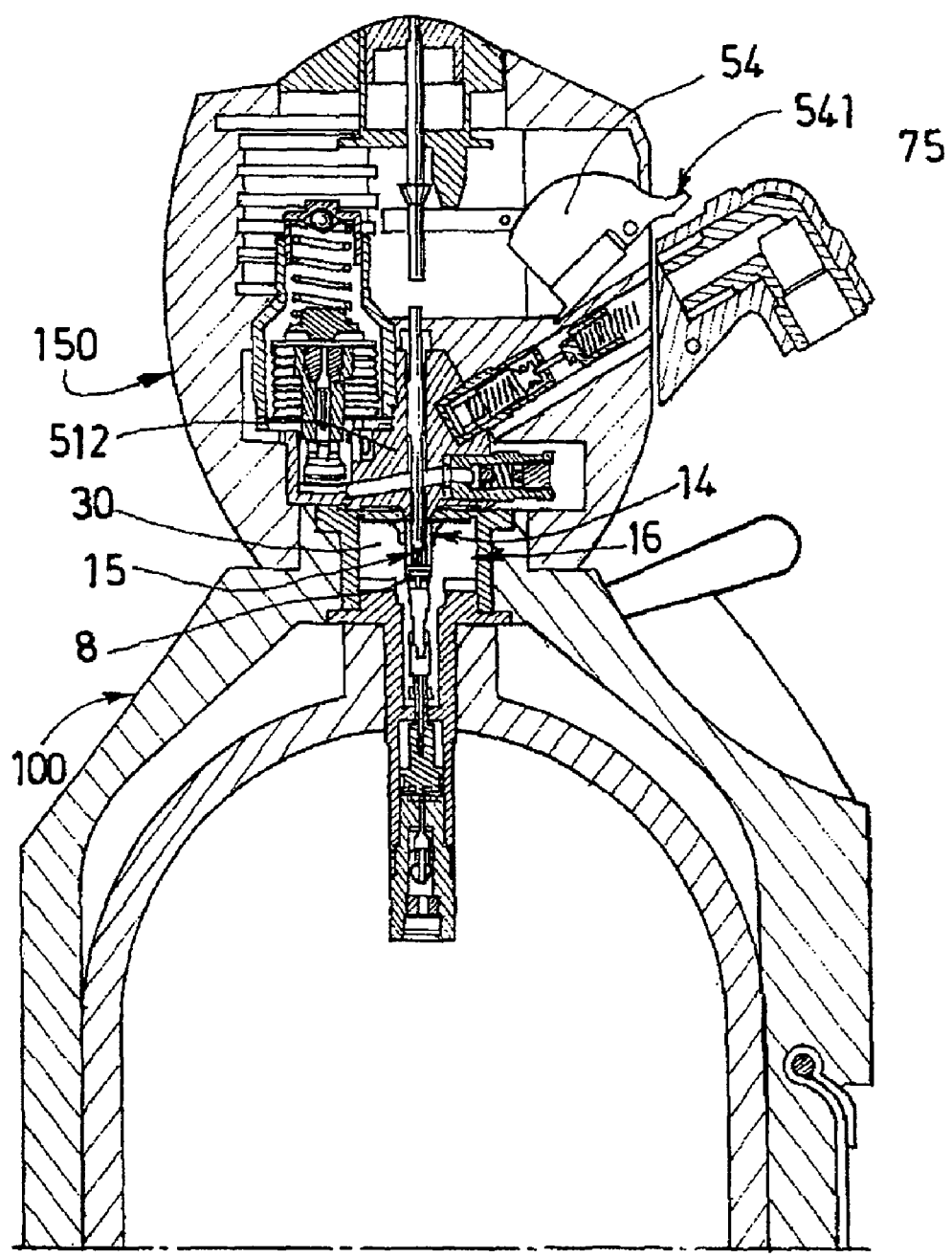
FIG. 12 is a view in longitudinal section of the delivery head equipped with its outlet coupling and mounted on a tank according to FIG. 2.

The lower part of the body 512 forms a connection interface that can collaborate with and be attached to the coupling interface of a tank 1 as described hereinabove and illustrated in FIG. 12. In FIG. 12, the gas delivery head 150 mates with and extends a protective jacket 100 of the tank 1.

Passing through the body 512 is a valve driver 17 which is dynamically sealed with respect to said body 512 by an O-ring seal. The upper end of the valve driver 17 comes into contact with the surface of the spindle of the control to open up the flow rate of gas 250 when the latter is pressed down and locked.

The spindle of the control to open up the flow rate of gas 250 may thus transmit a translational movement to the valve driver 17 which itself passes this translational movement on to the valve stem 8 of the tank 1 described hereinabove. The valve driver 17 therefore projects beyond the lower part of the body 512 to enter the head 2 of the tank 1, so as to open up the flow rate of gas.

The fluid stored in the tank 1 then enters the body 512 via the annular orifice 121. The annular orifice 121 simultaneously, via the transverse drilling 122, supplies a medium-pressure safety valve 123 and a pressure-regulating stage 58. The pressure-regulating stage 58 comprises a mechanism enclosed in a cartridge 88 which is screwed into the body 512 and sealed with respect to this body by an O-ring seal.

The medium-pressure safety valve 123 comprises a discharge valve 124 the opening of which is determined by the calibration force of a spring 125. The medium-pressure safety valve 123 is formed in such a way as to allow surplus pressure to be discharged through the louvers 115 formed in the two half-shells 511.

Gas enters the pressure-regulating stage 58 by passing through a filter 881 held by an elastic ring 582 held captive in a groove formed in the body 512. The entry of gas into the pressure-regulating stage 58 is also achieved via a passage around a spacer piece 83 that allows the fluid to arrive radially and uniformly at a pressure-regulating valve 84.

As a result of the force of a valve spring 85 and of the action of the gas, the pressure-regulating valve 84 collaborates with a seat 86. The seat 86 is held in place in the cartridge 88 under the action of a threaded seat holder P7.

The pressure-regulating valve 84 is equipped with a stem 841 extending upward and the end of which is in contact with a metal bellows 89. The metal bellows 89 is held in a sealed manner inside the body 512 under the combined action of a screw-on cap 894 and an O-ring seal 893. The valve 84 is subjected to the force of a pressure-regulating spring 891 preloaded by a pressure-regulating screw 892, and the force of the gas on the cross section of the metal bellows 89. The regulating valve 84 thereby regulates pressure.

Advantageously, the pressure-regulating screw 892 is adjustable so as to allow the user to vary the spring force and therefore the pressure regulation.

A drilling (not depicted) formed in the body 512 may allow the pressure-regulated gas to pass from inside the metal bellows 89 to an outlet connection 95. At the same time, this drilling formed in the body 512 may allow the pressure-regulated gas to pass between the metal bellows 89 and a low-pressure discharge valve (not depicted and, for example, of the same type as the valve 123 described hereinabove). The set points at which the two discharge valves open may be chosen to suit the requirements of the application.

An outlet connection 95 is screwed in a sealed fashion into the body 512. This male outlet connection comprises a skirt 591 containing a shut-off device 592 which is closed by default and sealed against said skirt 591 by the action of a spring 93. The shut-off device 592 prevents, on the one hand, the ingress of particles and dirt into the gas circuit when the outlet coupling 75 is not connected. In addition, the shut-off device 592 prevents any flow of fluid to the atmosphere in the event either of forced action on the opening control 250 while the outlet coupling 75 is not connected, or if the outlet coupling 75 becomes disconnected.

The outlet coupling 75 is made up of a body 71 containing a shut-off member 72. The shut-off member 72 is subjected to the action of a spring 73 so that by default it is closed and sealed against said body 71.

This shut-off member 72 on the one hand prevents the ingress of particles and dirt into the gas circuit when the outlet coupling 75 is not connected and on the other hand prevents the fluid contained in the supply pipe of the application from being dumped to the atmosphere if said outlet coupling 75 becomes disconnected. When the outlet coupling 75 is connected to the male outlet connection 95, on the one hand, the circuit becomes sealed under the action of an O-ring seal and, on the other hand, the circuit is opened by virtue of the mutual actions of the two shut-off members 72 and 592.

Advantageously, according to the invention, and as described in greater detail hereinafter, the head 150 may be shaped in such a way that:
  if the outlet coupling 75 is not connected into the orifice 105, it is impossible to lock the control to open the flow rate of gas 250,
  if the outlet coupling 75 is connected to the removable gas delivery head 150 in the orifice 105, it is possible to lock the control to open up the flow rate of gas 250, the shutting-off of the flow rate of gas being controlled by action on the annular knob 350 and the control 541 for unlocking the outlet coupling 75 is accessible,
  if the outlet coupling 75 is suddenly disconnected while the control to open up the gas is active, the latter control is instantly disconnected.

The orifice 105 of the head 150 comprises within it a male connection device 95 intended to collaborate with a complementary connection device borne by a coupling 75. When the on knob 250 is actuated, the valve driver 17 that opens up the gas of the appliance is activated but the presence of a shut-off element 54 at the male connection device 95 prevents any flow of gas.

Figure 8:
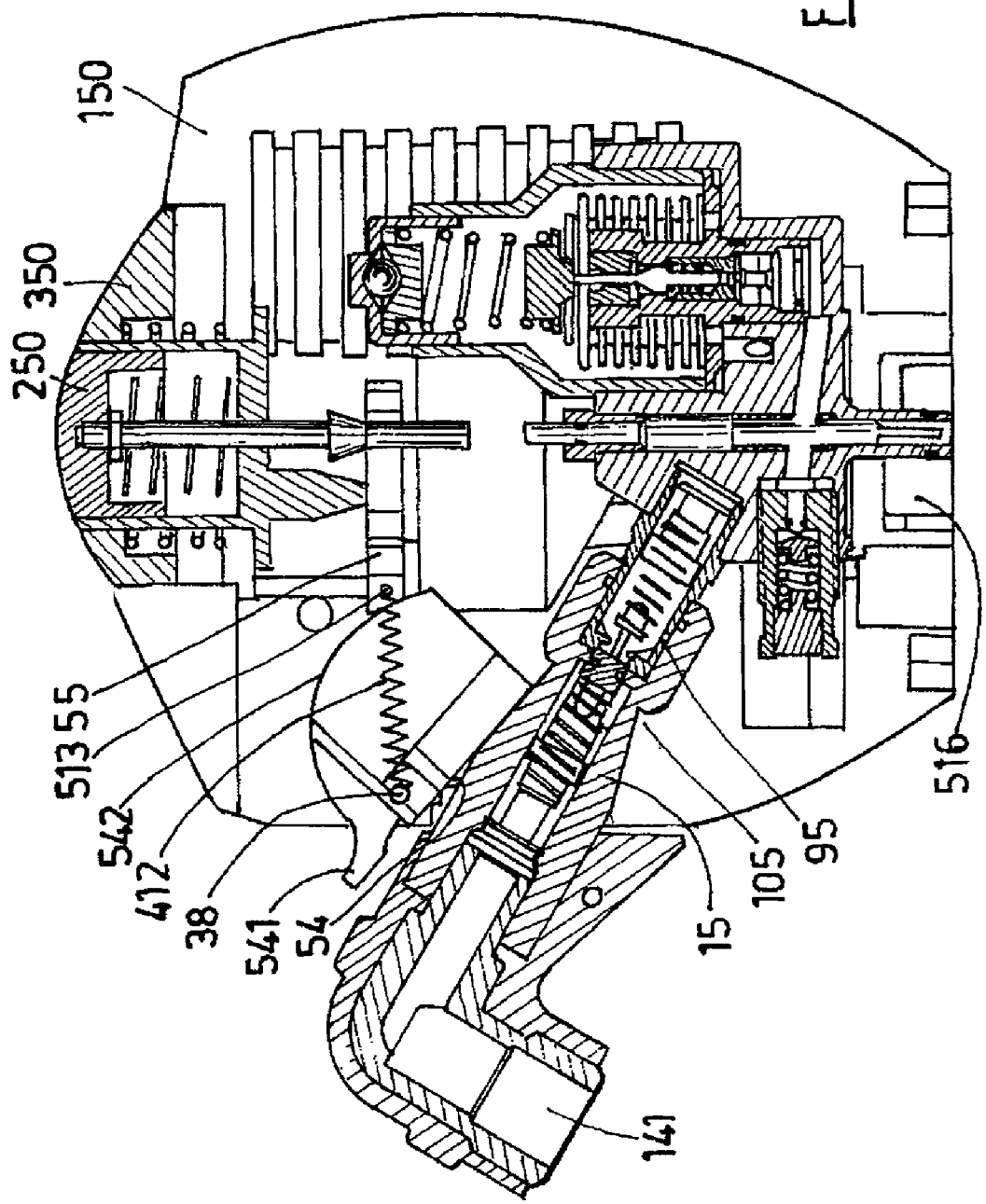
FIG. 8 is a view in longitudinal section of the delivery head equipped with its outlet coupling and in the off position.

FIG. 8 shows details of the gas delivery head 150 according to the same embodiment and of the on/off device equipped with its outlet coupling 75. At the time of connection, the outlet coupling 75 turns a shut-off shutter 54 with respect to a spindle 38 secured to the body 150.

As the shutter 54 turns, the cam profile 542 of the shutter 54 pushes against a fork 55. The fork 55 is translationally guided relative to the body 150 by a slot 101 (cf. FIGS. 6 and 7).

The locking fork 55 is kept in contact with the cam profile 542 by a tension spring 412. This tension spring 412 is attached on the one hand to the spindle 38 about which the shutter 54 rotates and, on the other hand, to a spindle 513 secured to the fork 55. The fluid delivery system can be switched on and locked.

Figure 9:
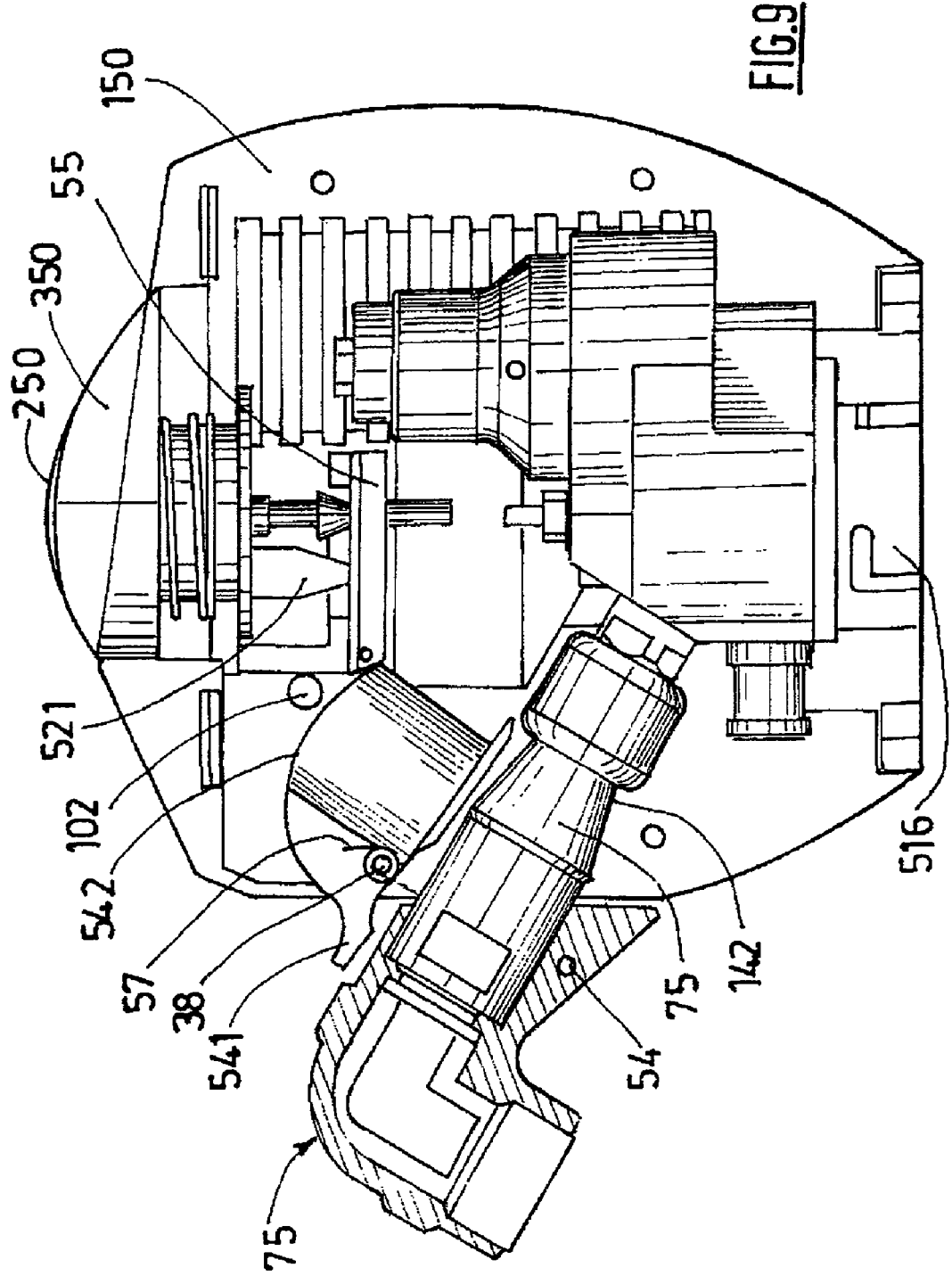
FIG. 9 is a view in longitudinal section of the delivery head equipped with its outlet coupling in the unlocked position.

FIG. 9 shows details of the gas delivery head 150 according to the same embodiment and of the on/off device equipped with its outlet coupling 75 in the unlocked position for disconnection.

The shutter 54 has a portion 541 that forms an unlocking trigger and is accessible from the outside. Sustained action on the unlocking trigger 541 forces the shut-off shutter 54 to open by rotating about the spindle 38 until the cam profile 542 comes into abutment with a bearing surface 102 of the body 150. The shutter 54 thus acts as a mating housing 142 formed on the exterior surface of the coupling. The outlet coupling 75 is thus unlocked and can be disconnected.

Figure 6:
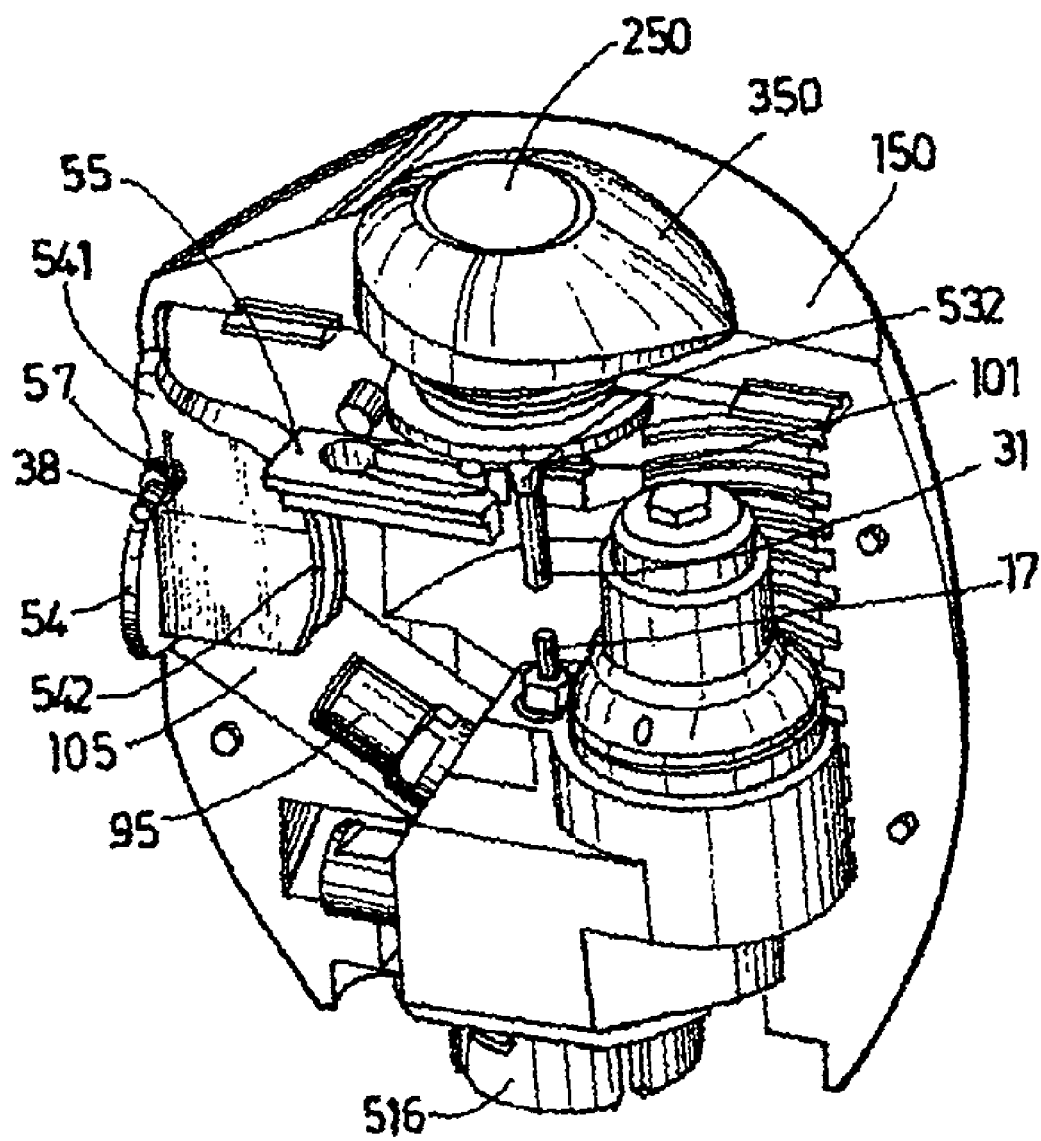
FIG. 6 is a view in isometric projection illustrating the inside of the delivery head without its outlet coupling.
Figure 7:
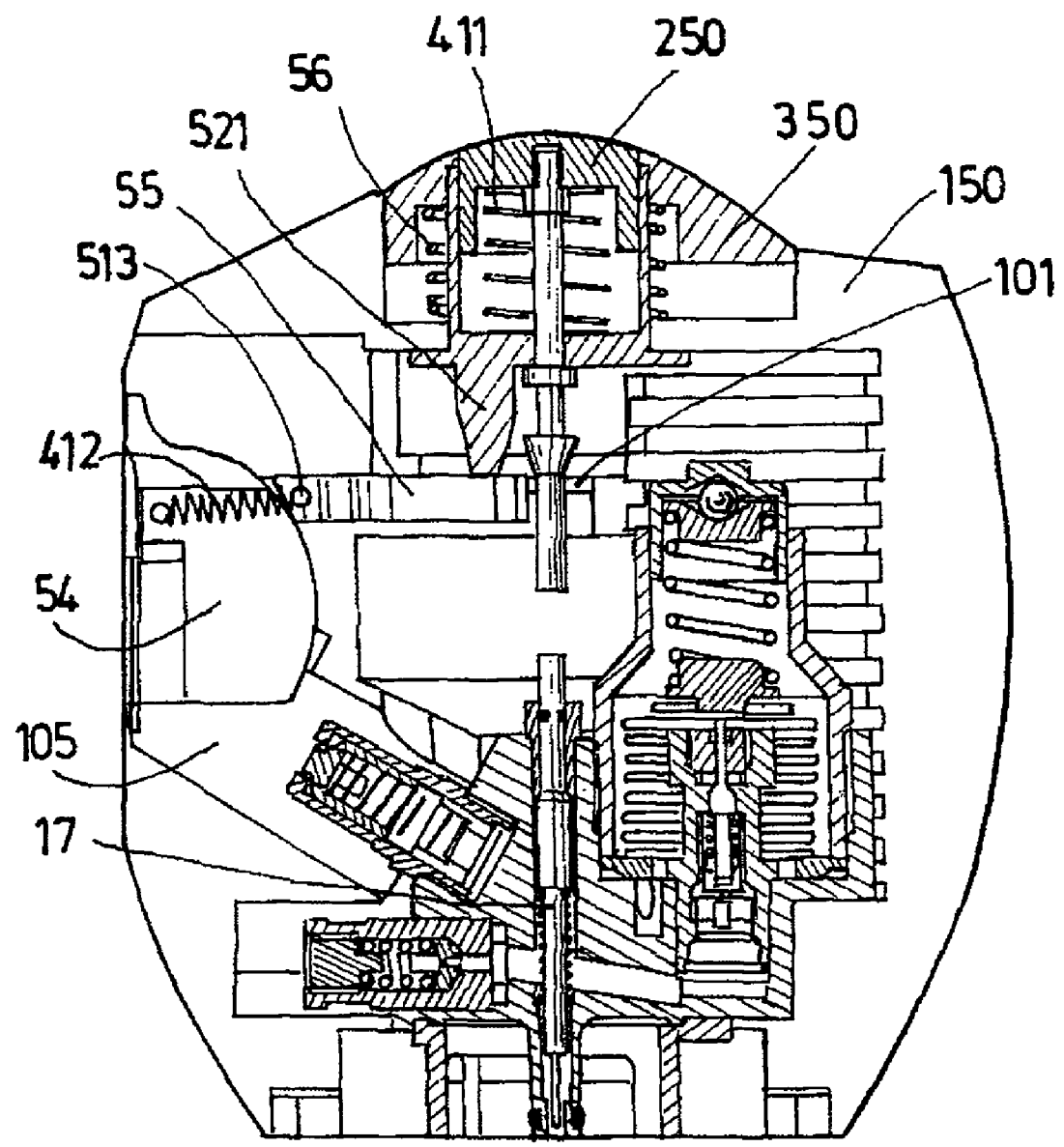
FIG. 7 is a view in longitudinal section illustrating the inside of the delivery head without its outlet coupling.

As soon as the outlet coupling 75 is extracted and action on the unlocking trigger 541 is released, the shut-off shutter 54 closes again under the action of an angular spring 57 (cf. FIGS. 6 and 9). The shut-off shutter 54 therefore drives the locking fork 55 into the shut-off position of the device. This is obtained through the fact that the locking fork 55 kept in contact with the cam profile 542 via the tension spring 412.

Figure 10:
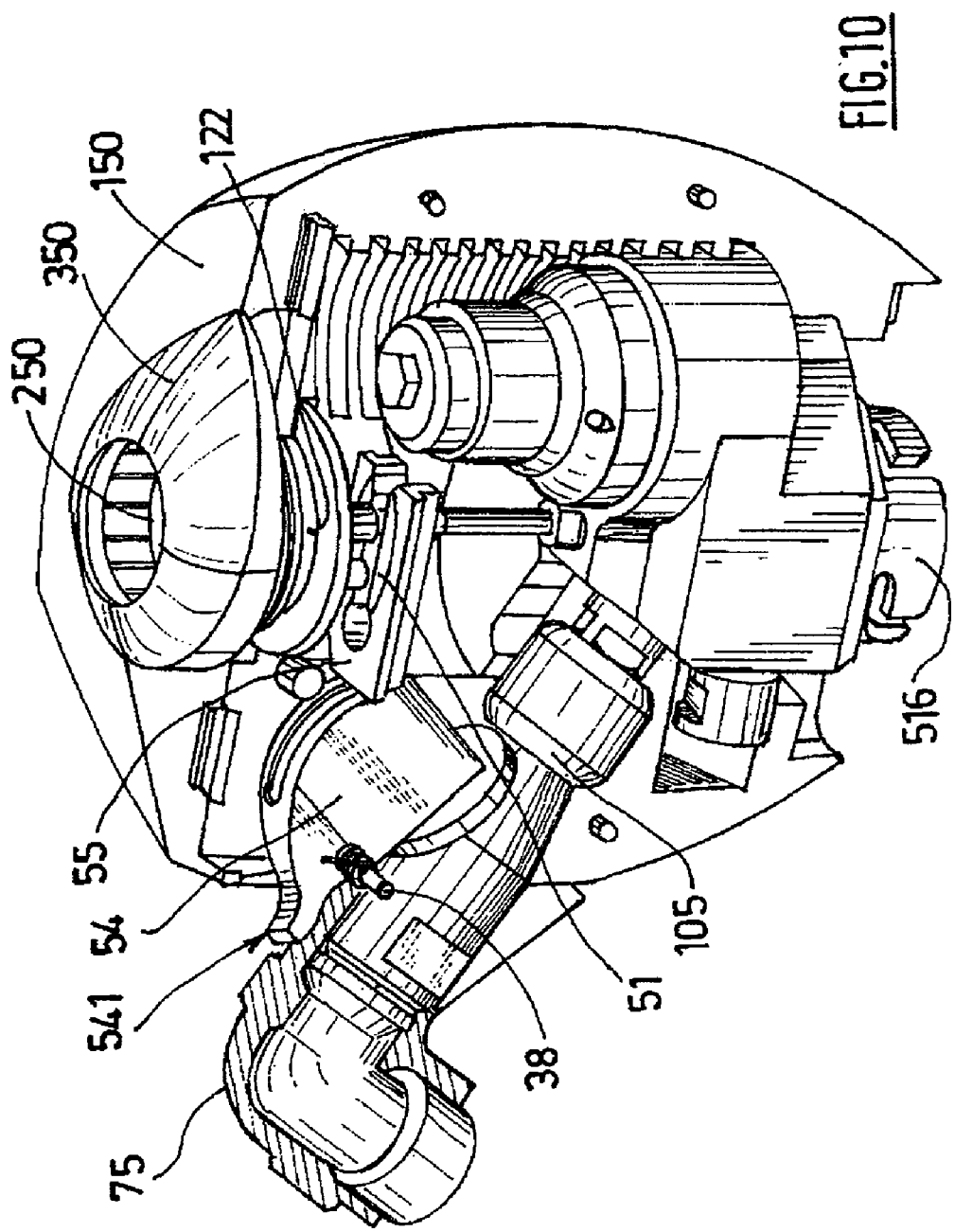
FIGS. 10 and 11 depict views in isometric projection and in longitudinal section, respectively, of the delivery head equipped with its outlet coupling and in the on position.
Figure 11:
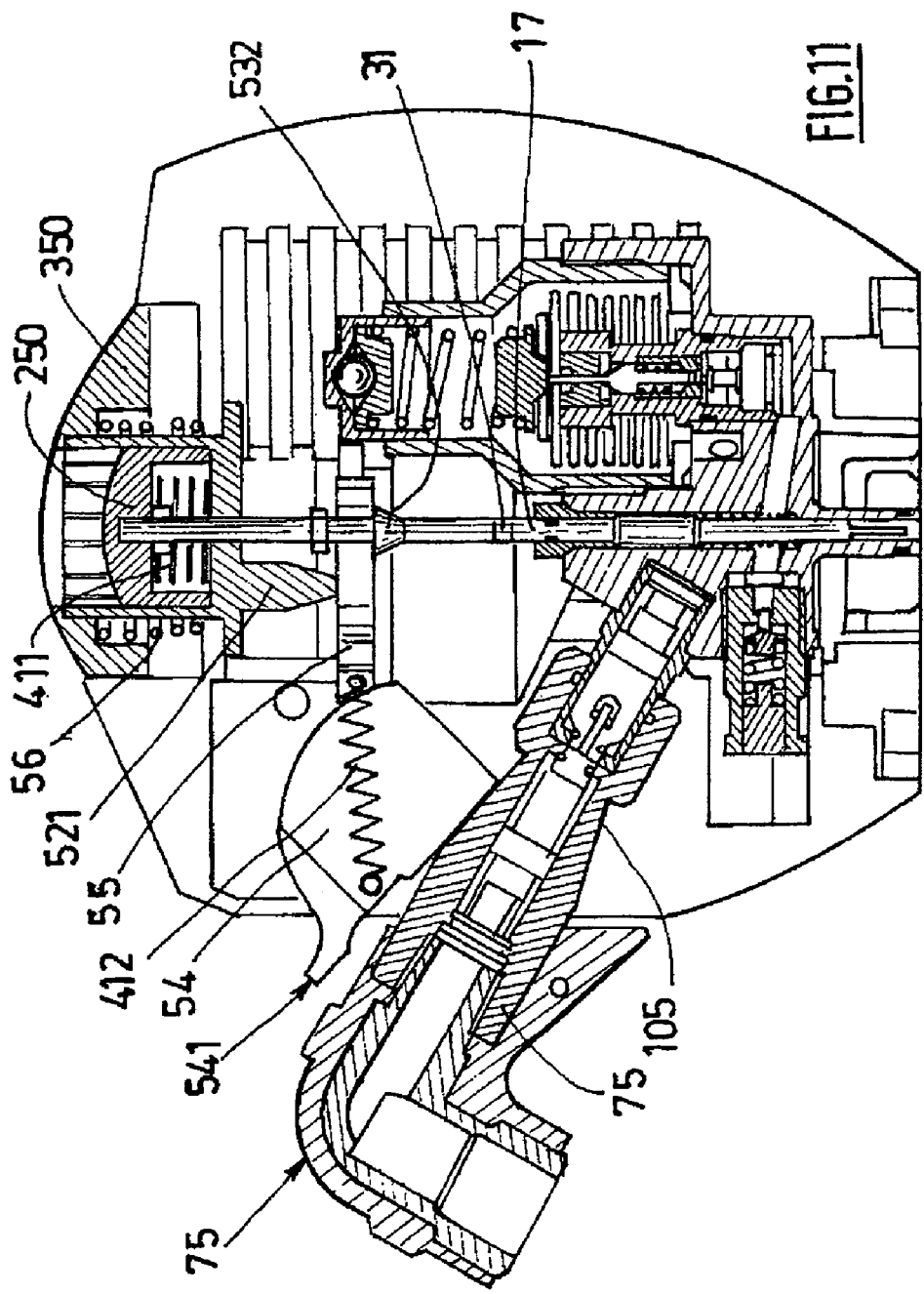

FIGS. 10 and 11 illustrate details of the gas delivery head 150 according to the same embodiment and of the on/off device equipped with its outlet coupling 75.

Various usages of the device are described hereinbelow.
On Function:
The locking fork 55 is indexed in the on position of the system (cf. connection of the outlet coupling 75 in FIG. 8). The on knob 250 comprises a stem provided with a cone 532 (FIG. 11). Upon action on the on knob 250, the cone 532 secured to the stem moves apart two elastic blades 51 that form the body of the locking fork 55 (FIG. 10). The cone 532 secured to the stem moves the two elastic blades 51 apart until it escapes them completely.

The action exerted on the knob 250 can be halted as soon as it reaches the end of its travel. Once the cone 532 has passed, the elastic blades 51 return to their initial shapes and hold the stem in the base of the cone 532. The end of the stem 31 of the on knob 250 therefore maintains the depressed position of the valve driver 17.

Off Function:
The annular off knob 350 comprises a cone 521 capable of separating the elastic blades 51 of the fork (FIG. 11). If a determined pressure is applied to the annular off knob 350, the off cone 521 will force the elastic blades 51 apart, freeing the on cone 532.

The spring 411 hitherto kept in compression can then return the on knob 250 to the off position.

In the example depicted, the axis of the off cone 521 is transversely offset from the on cone 532. Of course, as an alternative, the off cone 521 could be coaxial with the on cone 532.

The pressure exerted on the annular off knob 350 can then be halted. A spring 56 collaborating with the annular off knob 350 returns the latter to the released position. Two flats 122 may be formed on the off knob 350 in order to mount it and, in particular, to index it and to index the cone 521.

In this configuration, the system is switched off but still connected via the outlet coupling 75. The system can be switched on again as explained previously or the outlet coupling 75 may be disconnected from the orifice 105 as described in the paragraph relating to FIG. 9.

Emergency Stop Function:
If the outlet coupling 75 becomes suddenly disconnected while the control to open up the supply of gas is active, the locking fork 55 will return to its inactive position. Thus, the cone 532 is released. The spring 411 hitherto kept under compression will return the on knob 250 to the raised off position (cf. paragraph discussed in FIG. 9).

The invention thus provides control over the conditions under which delivery of gas from a gas delivery device is permitted. The invention also affords protection to the outlet orifice of the delivery device.

The system according to the invention thus acts as a breaker switch in which the on knob 250 (that is to say the knob that allows the delivery of gas) can remain engaged only if the connection conditions are satisfied. This on knob 250 becomes disconnected if the connection conditions are no longer satisfied.

In the proposed solution, protection for the outlet coupling is designed in such a way that it also provides information as to whether or not the device is connected.

The invention may be applied to any application that requires a high level of safety, great ease of use, good visibility of the system status and good compromise in terms of lightness of weight. By way of example, the invention can be applied to the storage and distribution of hydrogen for portable or mobile fuel cells, medical gases and gases for analysis and laboratory use.

The invention claimed is:

1. A device for controlling the filling and/or the extraction of fluid from a tank of pressurized fluid comprising:
    (a) a body having a connection end provided with attachment means intended to collaborate with a tank connection interface,
    (b) a member for opening a valve that can move relative to the body,
    (c) actuating means capable selectively of moving the opening member, the actuating means being able to move between an on position and an off position which correspond respectively to a work position and a rest position of the opening member,
    (d) an orifice intended to accommodate a removable inlet or outlet coupling for distributing fluid, and
    (e) retractable means of locking the actuating means in the on position, the retractable locking means being configured in such a way as to collaborate with the orifice in such a way that when a coupling is not connected to the control device in the orifice, the locking means are urged into their retracted position preventing the actuating means from remaining stably in the on position,
    wherein the retractable locking means are configured in such a way that when a coupling is connected to the control device in the orifice, a lock activation element transmits a force to the locking means so as to maintain the latter in an active position that locks the actuating means in the on position and
    wherein the device further comprises intermediate means that transmit the maintaining force to the locking means; the intermediate transmission means comprising a moving member that has a first end capable of collaborating in abutment with a coupling in the orifice and a second end capable of collaborating in abutment with the retractable locking means.

2. The device of claim 1, wherein when a coupling is disconnected and extracted from the orifice, the maintaining force on the locking means is automatically removed, the locking means being retracted in order to switch the actuating means into the off position.

3. The device of claim 1, wherein the device further comprises return means urging the locking means toward the retracted position.

4. The device of claim 1, wherein the device further comprises a shut-off element capable of being moved between positions in which it opens and closes the orifice for the coupling, and in that the shut-off element constitutes the moving member of the intermediate means for transmitting the maintaining force to the locking means.

5. The device of claim 4, wherein the shut-off element comprises an attachment portion, when the shut-off element is in the opening position, the attachment portion projecting into the orifice so as to allow it to collaborate for the purposes of attachment with a mating portion belonging to a coupling.

6. A device for controlling the filling and/or the extraction of fluid from a tank of pressurized fluid comprising:
    (a) a body having a connection end provided with attachment means intended to collaborate with a tank connection interface,
    (b) a member for opening a valve that can move relative to the body,
    (c) actuating means capable selectively of moving the opening member, the actuating means being able to move between an on position and an off position which correspond respectively to a work position and a rest position of the opening member,
    (d) an orifice intended to accommodate a removable inlet or outlet coupling for distributing fluid, and
    (e) retractable means of locking the actuating means in the on position, the retractable locking means being configured in such a way as to collaborate with the orifice in such a way that when a coupling is not connected to the control device in the orifice, the locking means are urged into their retracted position preventing the actuating means from remaining stably in the on position and, wherein the actuating means comprise a translationally mobile switch.

7. A device for controlling the filling and/or the extraction of fluid from a tank of pressurized fluid comprising:
    (a) a body having a connection end provided with attachment means intended to collaborate with a tank connection interface,
    (b) a member for opening a valve that can move relative to the body,
    (c) actuating means capable selectively of moving the opening member, the actuating means being able to move between an on position and an off position which correspond respectively to a work position and a rest position of the opening member,
    (d) an orifice intended to accommodate a removable inlet or outlet coupling for distributing fluid, and
    (e) retractable means of locking the actuating means in the on position, the retractable locking means being configured in such a way as to collaborate with the orifice in such a way that when a coupling is not connected to the control device in the orifice, the locking means are urged into their retracted position preventing the actuating means from remaining stably in the on position,
    wherein the retractable locking means are configured in such a way that when a coupling is connected to the control device in the orifice, a lock activation element transmits a force to the locking means so as to maintain the latter in an active position that locks the actuating means in the on position and, wherein the locking means comprise an elastic attachment portion, the elastic attachment portion and the actuating means having mating shapes so that when the locking means are in the active locking position the movement of the actuating means toward the on position causes the elastic attachment portion to become attached to the actuating means.

8. A device for controlling the filling and/or the extraction of fluid from a tank of pressurized fluid comprising:
    (a) a body having a connection end provided with attachment means intended to collaborate with a tank connection interface,
    (b) a member for opening a valve that can move relative to the body,
    (c) actuating means capable selectively of moving the opening member, the actuating means being able to move between an on position and an off position which correspond respectively to a work position and a rest position of the opening member,
    (d) an orifice intended to accommodate a removable inlet or outlet coupling for distributing fluid, and
    (e) retractable means of locking the actuating means in the on position, the retractable locking means being configured in such a way as to collaborate with the orifice in such a way that when a coupling is not connected to the control device in the orifice, the locking means are urged into their retracted position preventing the actuating means from remaining stably in the on position, wherein the device further comprises closure means intended to make the member move into its rest position and wherein the closure means are able to move between an inactive position and an active position, in the active position, the closure means collaborating with the actuating means in order to move and/or to deform an elastic attachment portion and thus release the locking of the actuating means.

9. An assembly made up of a pressurized-fluid tank and a control device, the tank comprising a casing delimiting a storage volume and provided with an orifice allowing communication with the inside of the tank, a filling and distribution head positioned at the orifice, an isolating member such as an isolating valve, a connection interface intended to collaborate removably with a control device, wherein the control device is a device according to claim 1.

* * * * *